Feb. 2, 1932.  R. J. NORTON  1,843,620
AUTOMOTIVE PART
Filed May 16, 1930
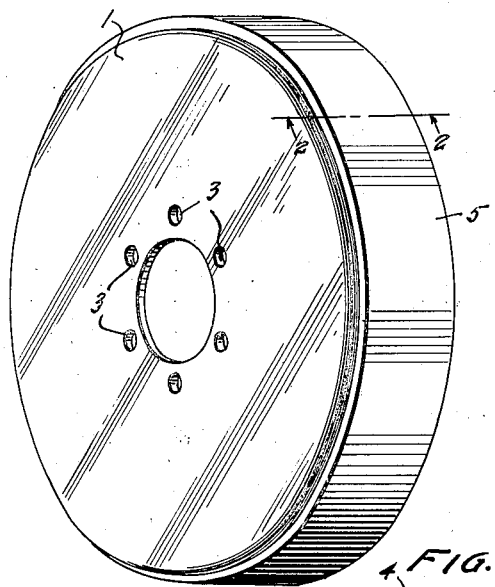
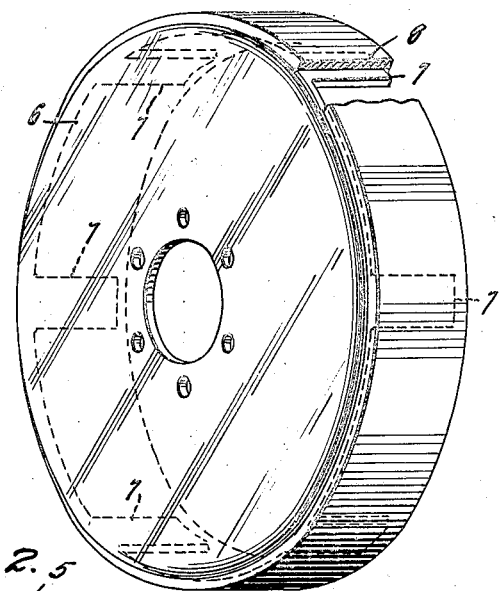
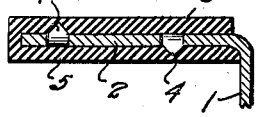
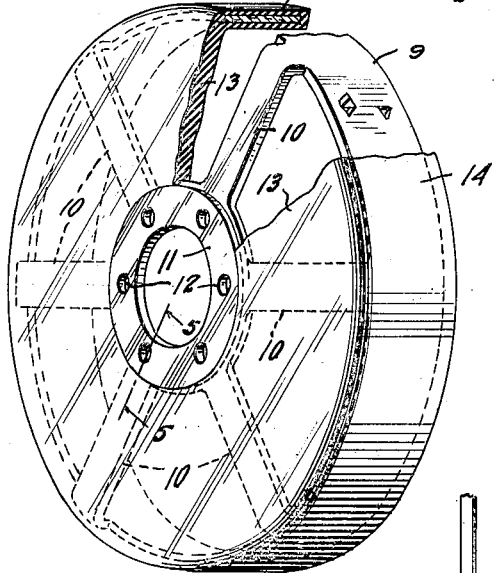
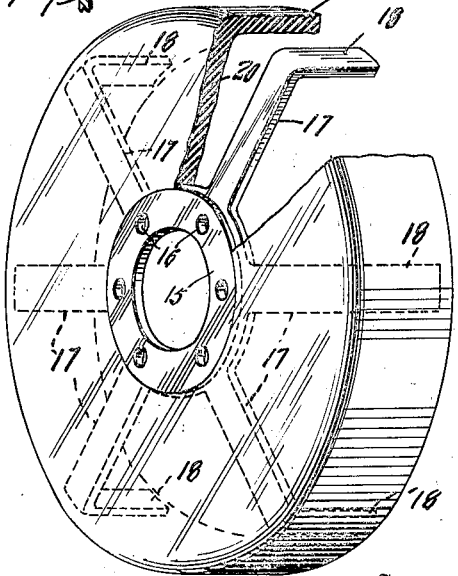
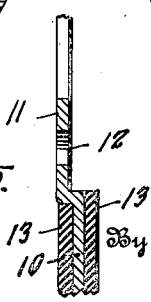
Inventor
RAYMOND J. NORTON
M. W. McConkey,
Semmes & Semmes
Attorneys Patented Feb. 2, 1932

1,843,620

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

AUTOMOTIVE PART

Application filed May 16, 1930. Serial No. 452,985.

This invention relates to automotive parts, and more particularly to an improved brake drum structure.

The ordinary brake drum now employed in automotive vehicles comprises a low carbon pressed steel member. With this is associated an internal expanding shoe, or an external strap. The friction material employed generally comprises a woven or felted asbestos, impregnated with a suitable binder.

Recently, the use of synthetic resins as binders in friction material has become widespread, due to a number of advantages presented by this type of structure.

It is advantageous, in many circumstances, to associate the friction material integrally and permanently with the drum. This, however, has been difficult, due to the fact that such synthetic resins have a low coefficient of thermal conductivity. Because of this, the generated heats of friction are not conducted away from the frictional engaging surfaces. These heats build up and soon reach such a magnitude as to deleteriously affect the friction facing.

Among other disadvantages accruing from this source is the fact that the friction materials are associated with a metallic member, or metals having a relatively high coefficient of expansion. Hence, when the metal and associated synthetic resin are subjected to the same degree of heating, a differential expansion occurs. This causes a separation of the two members with its concomitant disadvantages.

An object of this invention is to provide a metallo-resin drum.

Another object is to provide a composite metal and resin automotive part.

A further object is to provide a brake drum structure of permanently associated metallic and non-metallic parts having substantially the same thermal expansion.

Yet another object is to provide a composite automotive part having a core of a metal and a surface of a non-metal.

With these and other equally important objects in view, the invention comprehends an automotive brake part and more particularly a brake drum which is made up by moulding a suitably chosen synthetic resin about a core of a light weight metal which has substantially the same coefficient of thermal expansion as the resin.

In order to enable a ready comprehension of the invention, physical embodiments of it are shown in the accompanying drawings, in which:

Figure 1 is a perspective view of a brake drum made up in accordance with the principles of the present invention.

Figure 2 is a cross section taken on line 2—2 of Figure 1.

Figures 3 and 4 are perspective views of modified forms of a brake drum.

Figure 5 is a sectional view taken on line 5—5 of Figure 4.

Figure 6 is a view of a further modification.

In accordance with the principles of this invention, an automotive part, and more especially a brake drum, is made up by molding about a metallic core a synthetic resin composition, so as to obtain a composite member which has a substantially uniform coefficient of thermal expansion throughout. One outstanding characteristic of the phenol resins is their coefficient of thermal expansion. When heated to temperature of about 60° C. or above, these resinoids tend to shrink or diminish in size due to the loss of certain of the ingredients. However, under ordinary short period thermal changes the material expands considerably.

The expansion of these resinoids is widely different from that of the ordinary structural metals. The following comparisons of coefficients of expansion will serve to indicate the wide hiatus between these two.

Table I

| Material | Thermal expansion between 20 to 63° C. |
|---|---|
| Laminated phenolic insulating material | $20 \times 10^{-6}$ |
| Molded phenolic insulating material | $25 \text{ to } 45 \times 10^{-6}$ |
| Steel | $15 \times 10^{-6}$ |
| Annealed steel | $10 \times 10^{-6}$ |
| Copper | $15 \times 10^{-6}$ |
| Nickel steel (10% nickel) | $13 \times 10^{-6}$ |
| Invar steel (36% nickel) | $.9 \times 10^{-6}$ |
| Iron | $12 \times 10^{-6}$ |

From the foregoing table it will be observed that with respect to the ordinary structural metals the coefficients of expansion of condensation products are very high, and that if these were combined with ordinary structural metals such as carbon steel, nickel steel, or copper, there would be a decided tendency for the two materials to separate or pull apart if they were used in any fields in which they were subjected to any great temperature change.

In accordance with the present invention, however, there is combined with the resin, in the form of a composite article, a light weight non-ferrous alloy which possesses a coefficient of thermal expansion closely approximating that of the resinoids. The aluminum-copper-magnesium-silicon alloy, known to the trade as dural, serves effectively for this purpose. It has a coefficient of expansion quite closely approximating that of the resins. This is evidenced by a comparison of the coefficients of expansion as disclosed in the following table:

Table II

| Material | Average coefficient |
|---|---|
| Bakelite dilecto between 20 and 60° C. | $22 \times 10^{-6}$ |
| Continental bakelite (C. B. grade) between 25 and 60° C. | $31 \times 10^{-6}$ |
| Duralumin (sand cast) from 20 to 100° C. | $23.4 \times 10^{-6}$ |
| Duralumin (sand cast) between 20 to 250° C. | $25.7 \times 10^{-6}$ |

As is known, the dural compositions may be heat treated and quenched so as to very materially increase their tensile strength. Generally speaking, these materials have, between 20° and 200° C., a mean coefficient of thermal expansion of about $25 \times 10^{-6}$. It will be seen from the above table that the coefficient of expansion of the dural is well within the range of some of the condensation products, and it is therefore possible to make up a composite structure including a condensation product and a core of dural in which the coefficient of expansion will be substantially uniform throughout, and which when subjected to use at elevated temperatures will obviate any cleaving or pulling apart of the two elements.

It is also to be observed that the expansivity of these resinoids differs, depending not only upon the composition of the particular resin but also on the inclusions, that is to say, the filler materials which are employed. This relationship is indicated in the following table:

Table III

| Materials | Coefficient of expansion between 20° and 70° C. |
|---|---|
| Pure resin | $50 \text{ to } 110 \times 10^{-6}$ |
| Molded resin filled with wood filler | $25 \text{ to } 45 \times 10^{-6}$ |
| Molded resin filled with asbestos | $25 \text{ to } 45 \times 10^{-6}$ |
| Laminated resin (paper laminæ) | $20 \text{ to } 30 \times 10^{-6}$ |
| Laminated resin (canvas laminæ) | $20 \text{ to } 30 \times 10^{-6}$ |

It appears from the above that the laminated resins filled with either paper or canvas have a mean coefficient of expansion of about $25 \times 10^{-6}$ between 20° and 70° C. This coefficient corresponds quite closely to the coefficient of expansion of dural. It will therefore be seen that by a proper choice of the filler material, the coefficient of expansion of the particular resin which is desired to be employed may be modified. It is to be understood that the term resin or resinoids or synthetic resin as herein used comprehends the whole group of these materials of the phenol-methylene type. These generic terms, for example, include such specific resins as bakelite, furfural, acetylene resins, and the urea resins.

As indicated hereinbefore, the specific embodiment of the present invention relates to a composite metallo resin brake drum made up preferably of a light-weight high-strength non-ferrous alloy and a synthetic resinoid product which has substantially the same coefficient of expansion. It will be appreciated, however, that the invention is not limited to this, as other specific articles, such for example as steering wheels for automobiles, bearing structures and so forth may be manufactured. It will also be appreciated that, depending upon the particular use to which the article is to be put, the physical characteristics may be somewhat modified. Thus, for example, if it is desired to make up a composite article to be used as a bearing, the resin surface which constitutes the bearing surface might have permanently incorporated therein a predetermined amount of a lubricant. This may be done by impregnating the filler material with a liquid lubricant, or by suitably dispersing a solid lubricant, such as graphite, therein.

Likewise, and as shown in the drawings, the article may be made up in a variety of forms.

As shown in Figure 1, the brake drum structure may comprise a member stamped or otherwise suitably formed from a blank of dural so as to present the drumhead 1 and the continuous angularly extending flange 2. The drumhead, in the usual manner, may be provided with a central aperture through which projects the wheel axle and adjacently positioned apertures 3 through which extends the securing means.

The braking flange of the drum may be provided with the stamped out integral projections 4. These may be suitably spaced along the circumference of the flange and preferably project in opposite directions. As shown, particularly in Figure 2, these projections are embedded in the condensation product 5. Due to the relatively wide bearing surface presented by these projections, they serve to prevent any relative circumferential movement between the metallic core and the molded embedment.

The friction surface, and as shown in Figure 5 the entire flange, is constituted by a molded resinoid product. This may be applied in any desired manner and, as indicated above, may have any desired composition, that is to say any suitable filler material. When the resin which is employed is of the laminated type, the separate laminæ may be impregnated with a fusible form of the resin, and in this condition applied to the braking flange, as shown in Figure 2. It may then be placed under pressure to force the material down over the projections 4 and then transformed into the infusible form by the application of heat and pressure, in the manner well known to those skilled in the art. It will be observed that such a method of manufacture is particularly advantageous in manufacturing a brake drum, because of the high accuracy of the molding operation. This permits the molding of a drum having a desired curvature, and hence provides a desirable low tolerance or clearance between the drum and the associated shoe when the mechanism is assembled. It will be appreciated that the laminations may be given any directional characteristic with respect to the plane of the braking flange so as to modify the retardation characteristics of the drum.

If desired, there may be embedded in the material copper wires or other metallic filaments extending from the friction surface to the metal flange 2, so as to provide for conducting away the generated heat of friction.

In lieu of the laminated structure, a resin may be made up which is filled with wood, asbestos or any other suitable filler or friction modifying material.

In lieu of the structure shown in Figure 1 the drum may be made up in accordance with the structure disclosed in Figure 3. This may, for example, compose the drumhead 6 which is provided with a series of laterally extending lugs 7. These lugs 7 may be provided with the elements 4 so as to prevent relative circumferential movement between the metals and the non-metals. In this structure, the brake drum in effect comprises a continuous head and a non-continuous or discontinuous metallic braking flange core about which is molded a continuous non-metallic surface indicated at 8.

Again, the article may be made up as shown in Figure 4. This structure comprises a continuous metallic circumferential flange 9 which is joined, by the integral spider arms 10, to the central mounting collar 11. This collar is apertured as at 12 to receive the securing means to provide for attachment of the drum to the wheel. In this particular construction, the exposed surface of both the metallic circumferential flange 9 and the spider arms 10 are engaged or enclosed in the molded resin. The drum then comprises a non-metal drumhead 13 and a non-metal braking flange 14 enclosed within each of which are the metal cores 10 and 9 respectively.

The structure disclosed in Figure 4 may be further modified to provide a composite unitary structure shown in Figure 6. This comprises the central metallic collar 15, apertured at 16 for the purposes described and provided with integral spider arms 17. At the outer ends these spider arms are bent as at 18 to provide core members for the non-metallic braking flange. About this metallic core there is molded a continuous resin enclosure, in the manner described. After the article is finally made up, it therefore comprises a core of metal about which is molded a resinoid composition so as to provide a non-metallic braking flange 19 and a non-metallic brake head 20.

In each of the articles made up as shown in Figures 4 and 6, the resin or non-metal brake head is terminated short of the internal or central collars 11 and 15 respectively. In such circumstances, therefore, the braking stresses are transmitted through the resinoid friction surface to the metallic core member and thence to the central collar 11.

In operation, it will be appreciated that, as the entire brake drum is heated, due to the generated heats of friction, the resinoid material and the metallic core will expand substantially uniformly, and hence no substantial displacement between the metal and the non-metal occurs.

A brake drum made up in accordance with the present invention presents numerous advantages. The tensile properties of the drum as a whole are comparable to those of a steel member, since the tensile strength of heat treated dural approximates that of steel.

The exposed surface of the member comprises a resin, and hence presents all the advantages of facility of cleaning, non-corrodibility and desirable wearing qualities. The entire structure, due to the fact that it is made up of a light-weight alloy and a light-weight resin, provides an element which has a very high ratio of strength to weight, and hence renders it particularly useful in aviation use.

There have been shown and described a number of embodiments of the invention, but it is to be understood that these are given merely by way of example and as indicative of the many possible modifications and changes in design as well as the adaptation to those fields in which comparable factors are involved or similar results sought. Therefore, it is not intended to restrict the invention, short of its comprehensive scope as defined in the appended claims.

I claim:

1. A brake drum comprising composite metallic and resinoid portions of substantially the same thermal expansion.

2. A brake drum comprising a torque taking core of a nonferrous metal and a synthetic resin moulded thereon.

3. A brake drum comprising a core of dural and a synthetic resin moulded thereon.

4. A brake drum comprising a core of an aluminous alloy and a synthetic resin moulded thereon.

5. A brake drum comprising a massive torque taking core of a metallic member having a specific gravity less than iron and a synthetic resin moulded directly thereon.

6. A brake drum comprising a torque taking core of a magnesium alloy and a resinoid moulded thereon.

7. A brake drum comprising a torque taking core of a light weight non-ferrous alloy and a resinoid moulded thereon.

8. A brake drum comprising an alloy having a coefficient of thermal expansion greater than $15 \times 10^{-6}$ and a synthetic resin moulded thereabout.

9. A brake drum comprising an alloy having a coefficient of thermal expansion greater than $15 \times 10^{-6}$ and a synthetic resin having approximately the same thermal expansion as said alloy associated therewith.

10. A brake drum comprising an aluminous alloy core and a synthetic resin having the same thermal expansion as the alloy moulded thereon.

In testimony whereof I affix my signature.

RAYMOND J. NORTON.